US012431309B2

(12) United States Patent
Jang et al.

(10) Patent No.: US 12,431,309 B2
(45) Date of Patent: Sep. 30, 2025

(54) ELECTROMAGNETIC CONTACTOR

(71) Applicant: LS ELECTRIC CO., LTD., Anyang-si (KR)

(72) Inventors: Kyeonghun Jang, Anyang-si (KR); Minseok Kim, Anyang-si (KR); Deokyong Yun, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 257 days.

(21) Appl. No.: 17/793,519

(22) PCT Filed: Dec. 24, 2020

(86) PCT No.: PCT/KR2020/019062
§ 371 (c)(1),
(2) Date: Jul. 18, 2022

(87) PCT Pub. No.: WO2021/145583
PCT Pub. Date: Jul. 22, 2021

(65) Prior Publication Data

US 2023/0121694 A1 Apr. 20, 2023

(30) Foreign Application Priority Data

Jan. 17, 2020 (KR) ........................ 10-2020-0006826

(51) Int. Cl.
*H01H 50/04* (2006.01)
*H01H 50/54* (2006.01)

(52) U.S. Cl.
CPC ........ *H01H 50/045* (2013.01); *H01H 50/047* (2013.01); *H01H 50/54* (2013.01)

(58) Field of Classification Search
CPC ........................... H01H 50/045; H01H 50/047
(Continued)

(56) References Cited

U.S. PATENT DOCUMENTS 2,514,913 A * 7/1950 Tyrner .................... H01H 50/22 200/16 A
3,099,730 A * 7/1963 Tateishi ............... H01H 50/546 335/202
(Continued)

FOREIGN PATENT DOCUMENTS

CN 203434091 U 2/2014
JP 06124639 A 5/1994
(Continued)

OTHER PUBLICATIONS

Extended European Search Report for related European Application No. 20914456.7; action dated Jan. 5, 2024; (9 pages).
(Continued)

*Primary Examiner* — Alexander Talpalatski
(74) *Attorney, Agent, or Firm* — K&L Gates LLP

(57) ABSTRACT

The present disclosure relates to a frame of an electromagnetic contactor, and more specifically, to an electromagnetic contactor having excellent coupling force between an arc box and a frame. The electromagnetic contactor, comprises: a lower frame; an upper frame coupled to the upper portion of the lower frame; and an arc cover coupled to the upper portion of the upper frame, wherein a first coupling part is protrudingly formed on one surface of the lower frame, a second coupling part, connected to the first coupling part, is protrudingly formed on one surface of the upper frame, and a third coupling part, connected to the second coupling part, is protrudingly formed on one surface of the arc cover, wherein the fastening member is fastened by connecting the first coupling part, the second coupling part and the third coupling part.

7 Claims, 7 Drawing Sheets

(58) Field of Classification Search
USPC .................................................. 335/131, 202
See application file for complete search history.

(56) References Cited

U.S. PATENT DOCUMENTS

| | | | | | |
|---|---|---|---|---|---|
| 3,222,476 | A * | 12/1965 | Whiting | H01H 50/22 | 335/131 |
| 3,251,964 | A * | 5/1966 | Lawrence | H01H 50/22 | 335/131 |
| 3,453,571 | A | 7/1969 | Koertge | | |
| 4,907,464 | A * | 3/1990 | Isozumi | F02N 15/066 | 335/131 |
| 5,278,531 | A * | 1/1994 | Link | H01H 9/342 | 335/8 |
| 6,111,488 | A * | 8/2000 | Nakamura | H01H 50/045 | 335/132 |
| 6,208,229 | B1 | 3/2001 | Zindler et al. | | |
| 6,377,144 | B1 * | 4/2002 | Castonguay | H01H 71/0257 | 335/8 |
| 7,358,837 | B2 * | 4/2008 | Puskar | H01H 71/0257 | 200/293 |
| 8,487,722 | B2 * | 7/2013 | Mills | H01H 50/12 | 335/131 |
| 2016/0079021 | A1 * | 3/2016 | De Barros Albuquerque | H01H 50/02 | 335/202 |

FOREIGN PATENT DOCUMENTS

| | | | |
|---|---|---|---|
| JP | 06342622 | A | 12/1994 |
| KR | 2019980012057 | U | 5/1998 |
| KR | 1019980035923 | A | 8/1998 |
| KR | 2019980031038 | U | 8/1998 |
| KR | 20090003392 | U | 4/2009 |

OTHER PUBLICATIONS

International Search Report for related International Application No. PCT/KR2020/019062; report dated Jul. 22, 2021; (5 pages).
Written Opinion for related International Application No. PCT/KR2020/019062; report dated Jul. 22, 2021; (5 pages).
Korean Office Action for related Korean Application No. 10-2020-0006826; action dated May 24, 2021; (4 pages).
Notice of Allowance for related Korean Application No. 10-2020-0006826; action dated Nov. 10, 2021; (2 pages).
Office Action for related Chinese Application No. 202080092698.8; action dated Apr. 19, 2025; (12 pages).

* cited by examiner

ELECTROMAGNETIC CONTACTOR

CROSS-REFERENCE TO RELATED APPLICATIONS

This application is the National Stage filing under 35 U.S.C. 371 of International Application No. PCT/KR2020/019062, filed on Dec. 24, 2020, which claims the benefit of earlier filing date and right of priority to Korea utility model Application No. 10-2020-0006826 filed on Jan. 17, 2020, the contents of which are all hereby incorporated by reference herein in their entirety.

FIELD

The present disclosure relates to a frame of an electromagnetic contactor, and more particularly, to an electromagnetic contactor capable of applying excellent coupling force between an arc box and a frame.

BACKGROUND

In general, an electromagnetic contactor is a kind of electrical circuit switchgear that transmits a mechanical driving signal and a current signal using the principle of an electromagnet, and is installed in various industrial facilities, machines, and vehicles.

A magnetic contactor includes a fixed contact tip and a moving contact tip that open and close an electric circuit for supplying electricity to a load such as a motor, a coil and a core (fixed core and movable core) that constitute an electromagnet for performing an opening operation of the moving contact tip, and a crossbar that is a connecting mechanism for transferring movement of the electromagnet to the contact tip.

When a specified voltage is applied to the coil, an excitation current flows, to generate magnetic flux in the fixed core, which then turns into a magnet. Accordingly, the movable core is attracted toward the fixed core. A moving contact and the moving contact tip are coupled to the crossbar which is connected to the movable core, so as to be movable in response to the movement of the movable core, and are brought into contact with a fixed contact and the fixed contact tip which are fixed to the frame, so as to close the circuit (closed state, electrically-connected state).

When the voltage applied to the coil is cut off, excitation (magnetization) of the fixed core is released and the movable core returns to its original position by a return spring, causing the moving contact tip to be separated from the fixed contact tip, thereby breaking the circuit (open state).

When the circuit is opened/closed, an arc is generated between the contact tips, and is extinguished by an arc box and a grid disposed in the arc box.

FIG. 1 is a cutoff perspective view illustrating an electromagnetic contactor according to the related art.

In general, the configuration of the electromagnetic contactor includes a case (arc box) 9, a frame 1, a fixed contact tip 7, and a moving contact tip 8, and also typically includes an electric actuator for driving the moving contact tip 8 such that opening and closing between contact tips can be controlled by an electric signal.

The fixed contact tip 7 is connected to a power supply source or a load, and the moving contact tip serves as a switch that is brought into contact with or separated from the fixed contact tip 7.

The frame 1 is divided into a lower frame 1*a* and an upper frame 1*b* to accommodate the fixed contact tip 7, a moving contact tip 8, and the electric actuator therein.

The electric actuator is a kind of electromagnet that forms an electromagnetic field, in response to power-on of a power supply source, so as to generate an electric attraction, and includes a fixed core 2, a movable core 5, a coil 3, a bobbin 4, and a crossbar 6.

Here, a coil assembly in which the coil 3 and the bobbin 4 fixing the coil 3 are coupled is inserted into the lower frame 1*a*. When external power is applied to the coil 3, a current flows in the coil 3, and the fixed core 2 is excited to attract the movable core 5. As the movable core 5 moves downward, the crossbar 6 and the moving contact tip 8 move together, and the moving contact tip 8 comes into contact with the fixed contact tip 7, such that the circuit is electrically connected.

FIG. 2 is a view illustrating an electromagnetic contactor according to another implementation of the related art, and FIG. 3 is a lateral cross-sectional view of the electromagnetic contactor.

The frame that protects and fixes all parts of the electromagnetic contactor roughly includes a lower frame 1*a*, an upper frame 1*b*, and an arc box 1*c*.

Conventionally, in order to fix the three parts, the lower frame 1*a* and the upper frame 1*b* are fastened with nuts 12 and screws 11, and the arc box 1*c* is fixed to the upper frame 1*b* with a fastening member 10 such as a rivet assembly, etc.

However, the fastening member 10 used when assembling the arc box 1*c* has weak fixing force, and thereby damaged or disassembled due to a fault current when a short-circuit accident occurs.

SUMMARY

The present disclosure has been devised to solve the above-described problems, and one aspect of the present disclosure is to provide an electromagnetic contactor capable of preventing an arc box from being separated from a frame.

An electromagnetic contactor in accordance with one implementation of the present disclosure may include a lower frame, an upper frame coupled to an upper portion of the lower frame, and an arc cover coupled to an upper portion of the upper frame. A first coupling part may protrude from one surface of the lower frame such that a fastening member is coupled, a second coupling part may protrude from one surface of the upper frame and may be connected to the first coupling part, such that the fastening member is fastened, and a third coupling part may protrude from one surface of the arc cover and may be connected to the second coupling part, such that the fastening member is fastened. The fastening member may be coupled through the first coupling part, the second coupling part, and the third coupling part.

Here, the first coupling part may have a predetermined length from an upper end portion of the lower frame, and may be shorter than a length (height) of the lower frame.

The second coupling part may have a length from an upper end portion to a lower end portion of the upper frame.

The first coupling part may have a predetermined length from a lower end portion of the lower frame, and may be shorter than a length (height) of the arc cover.

A first fastening hole may be formed vertically through the first coupling part such that the fastening member is coupled, a second fastening hole may be formed vertically through the second coupling part such that the fastening member is coupled, and a third fastening hole may be formed vertically through the third coupling part such that the fastening member is coupled.

A first auxiliary fastening hole may be formed through the first coupling part to be adjacent to the first fastening hole, a second auxiliary fastening hole may be formed through the second coupling part to be adjacent to the second fastening hole, and an auxiliary fastening member may be provided to be coupled through the first auxiliary fastening hole and the second auxiliary fastening hole.

The first coupling part, the second coupling part, and the third coupling part may be formed respectively at the lower frame, the upper frame, and the arc cover, on each of both side portions of one surface thereof.

The first coupling part, the second coupling part, and the third coupling part may be formed respectively at the lower frame, one surface of the upper frame, and one surface of the arc cover, on each of both opposite surfaces thereof.

The first coupling part, the second coupling part, and the third coupling part may be formed on a surface where a fixed contact arm is not exposed based on the upper frame.

A top cover may be coupled to an upper portion of the arc cover. The top cover may have a cover fastening hole, the arc cover may have an inter-phase insulating groove, and a cover fastening member may be provided to be coupled through the cover fastening hole and the inter-phase insulating groove.

According to an electromagnetic contactor according to an implementation of the present disclosure, a first coupling part, a second coupling part, and a third coupling part may protrude from an upper frame, a lower frame, and an arc cover, respectively, and a coupling member may be provided to be coupled through the first coupling part, the second coupling part, and the third coupling part, which can secure stable coupling force of the arc cover.

The coupling of the upper frame, the lower frame, and the arc cover can be achieved at a time by the coupling member, thereby enhancing efficiency of an assembling operation.

Auxiliary fastening members for fixing the upper frame and the lower frame can be additionally provided to increase coupling force between the upper frame and the lower frame.

A cover coupling member may be provided for a top cover disposed on an upper portion of the arc cover, thereby enhancing the coupling force.

This can prevent separation of the arc cover even if an impact is caused due to a repeated arc extinguishing operation.

DETAILED DESCRIPTION

Hereinafter, preferred implementations of the present disclosure will be described with reference to the accompanying drawings, so that a person skilled in the art can easily carry out the invention. It should be understood that the technical idea and scope of the present disclosure are not limited to those preferred implementations.

Figure 1:
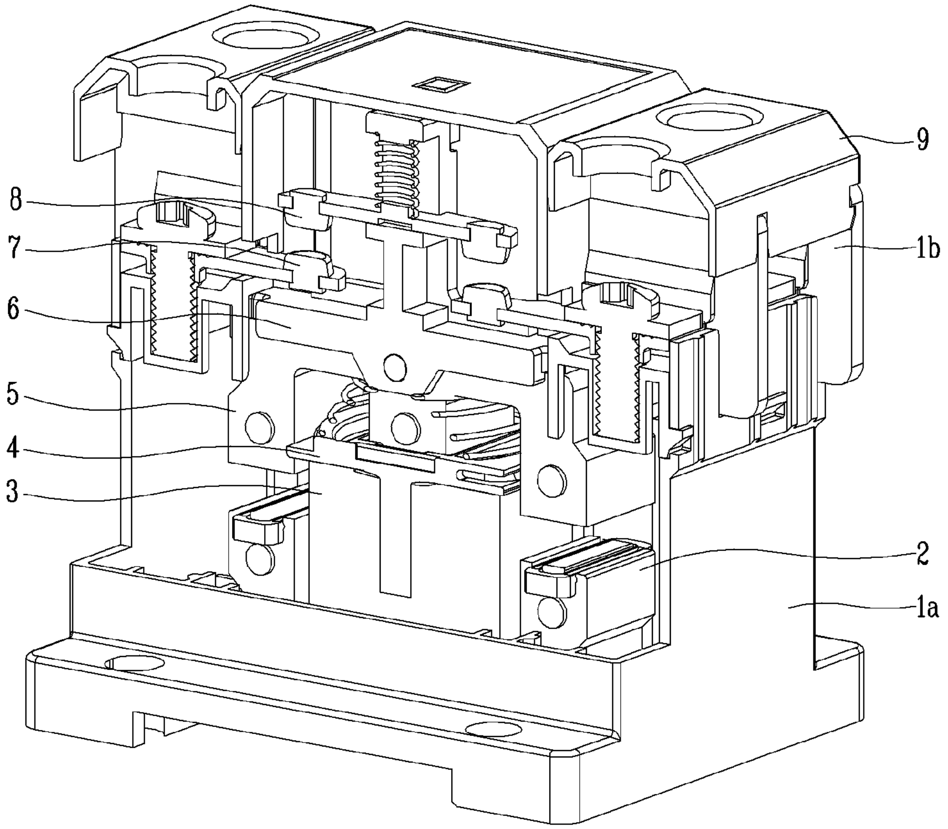
FIG. 1 PRIOR ART
FIG. 1 is a cutoff perspective view illustrating an electromagnetic contactor according to the related art.
Figure 2:
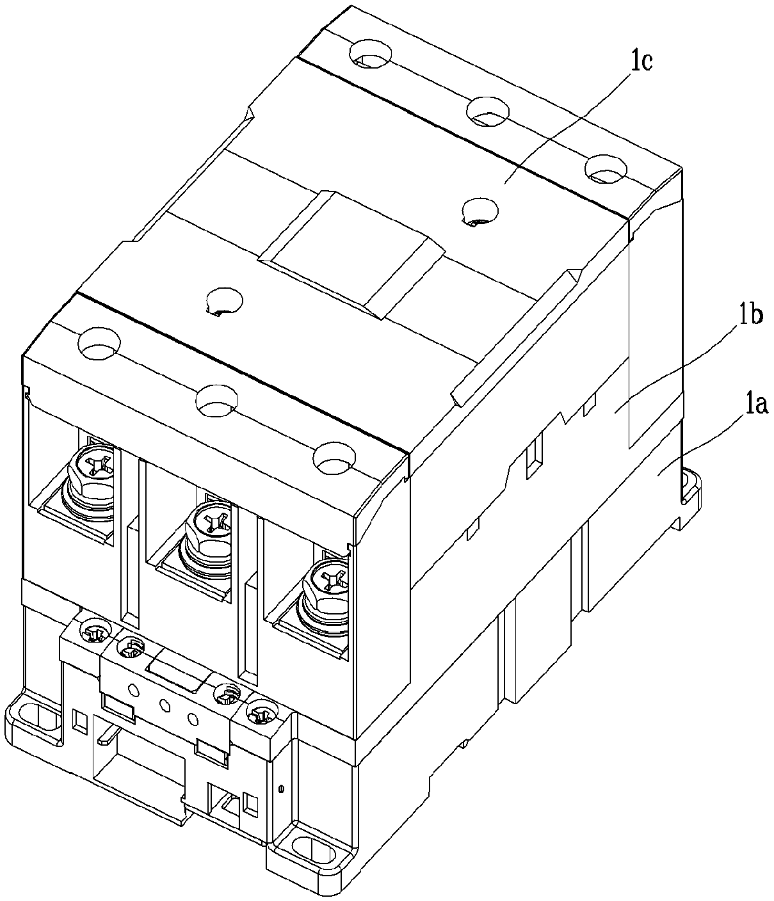
FIG. 2 PRIOR ART
FIGS. 2 and 3 are an external perspective view and a lateral cross-sectional view of an electromagnetic contactor according to the related art.
Figure 3:
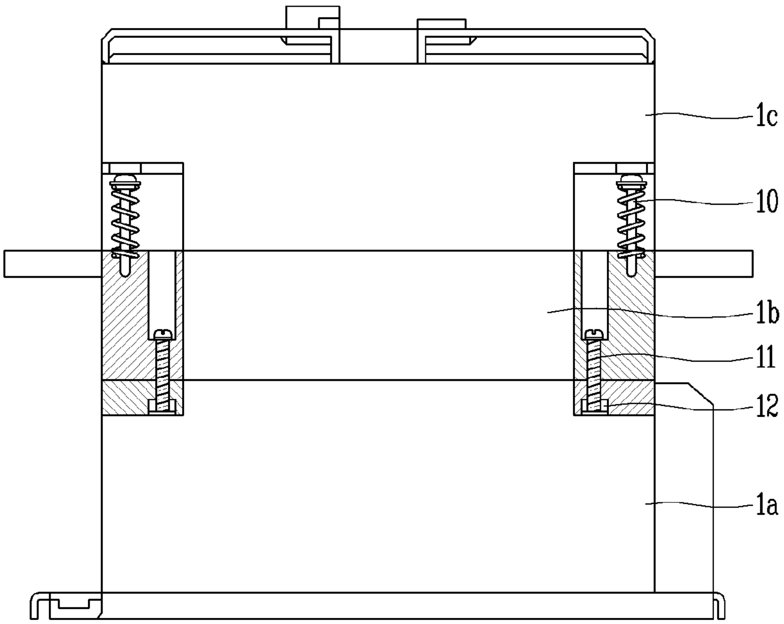
FIG. 3 PRIOR ART
Figure 4:
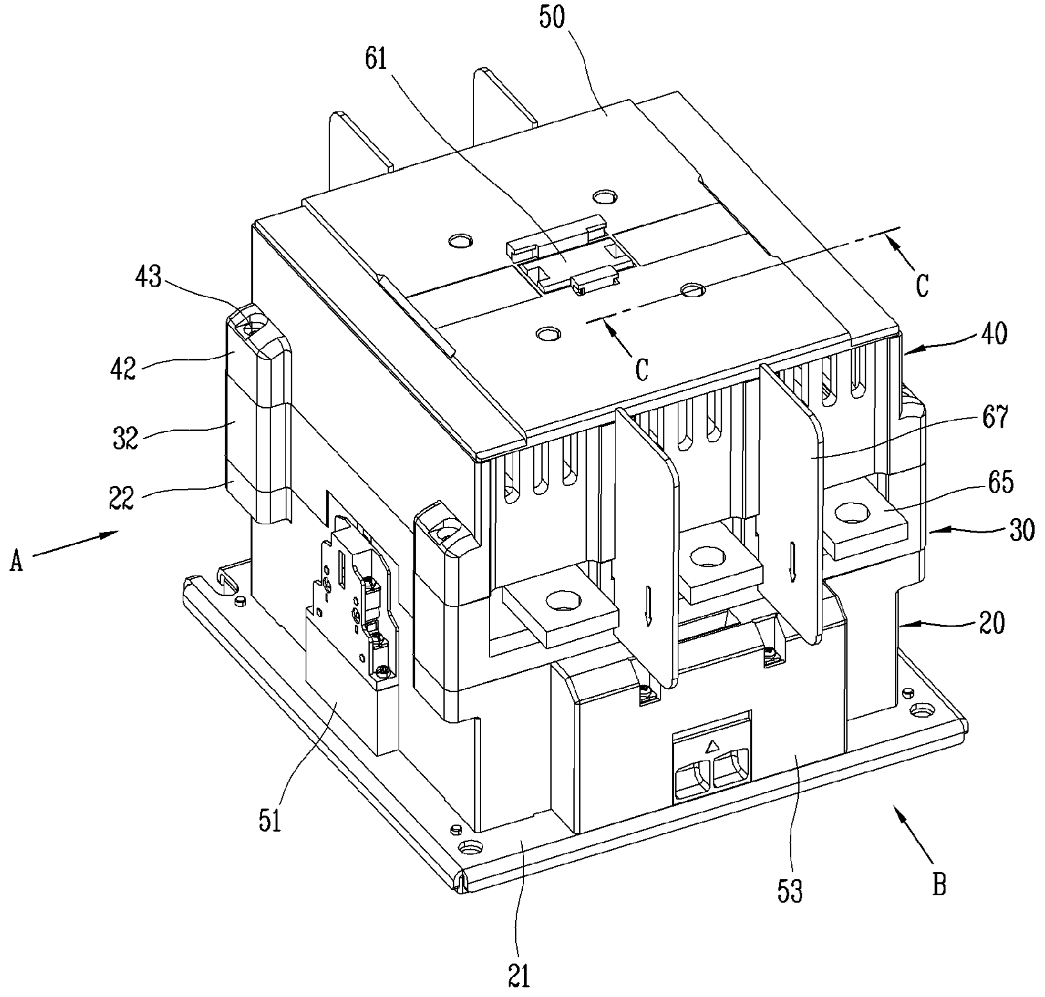
FIGS. 4 to 6 are a perspective view, an exploded perspective view, and a lateral view in a direction A illustrating an enclosure of an electromagnetic contactor in accordance with one implementation of the present disclosure.
Figure 5:
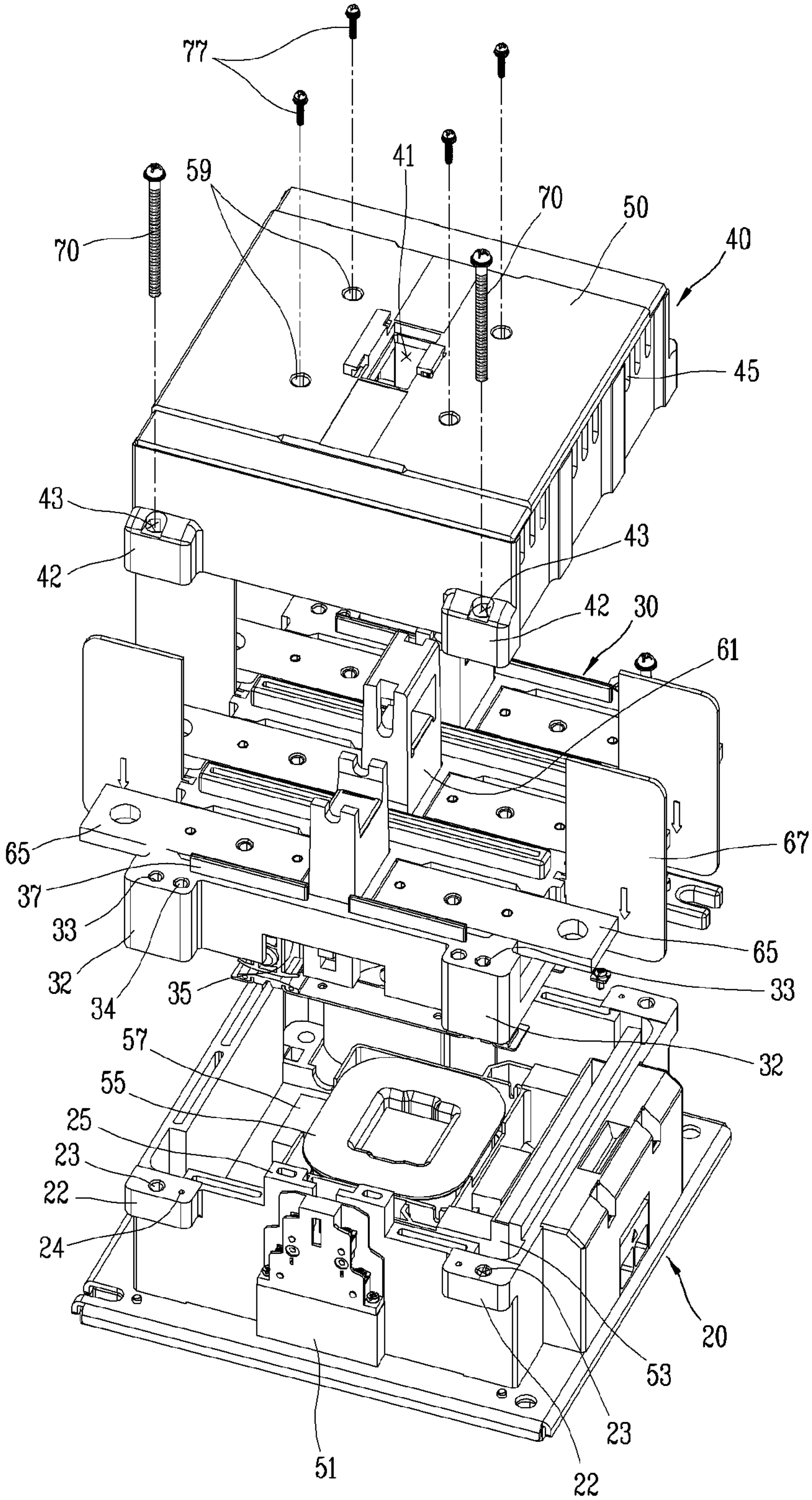
Figure 6:
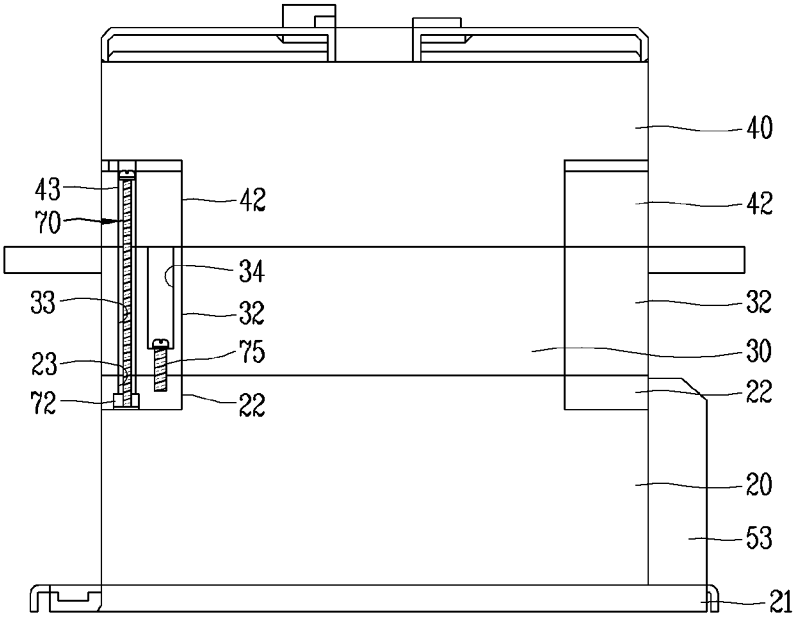
Figure 7:
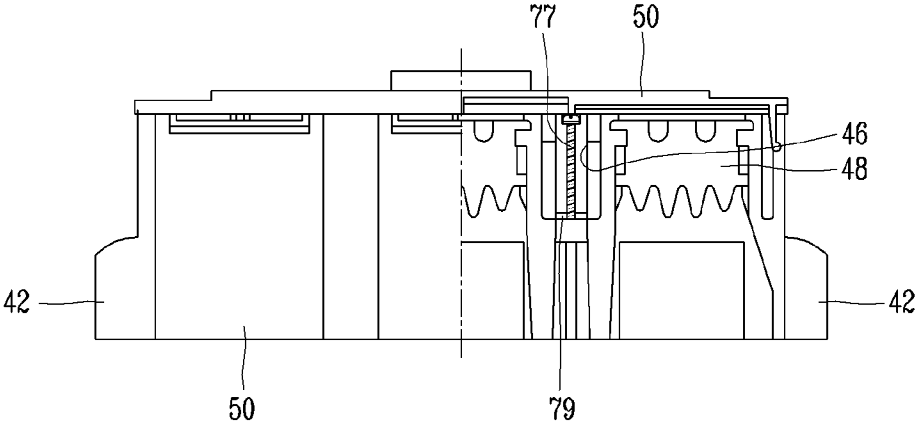
FIG. 7 is a partial lateral view in a direction B in FIG. 4, and is a partially cross-sectional view taken along the line C-C.

FIGS. 4 and 6 are a perspective view, an exploded perspective view, and a lateral view in a direction A illustrating an enclosure of an electromagnetic contactor in accordance with one implementation of the present disclosure. FIG. 7 is a partial lateral view in a direction B in FIG. 4, and is a partial cross-sectional view taken along the line C-C.

Hereinafter, an electromagnetic contactor in accordance with each implementation of the present disclosure will be described in detail with reference to the accompanying drawings.

An electromagnetic contactor according to an implementation of the present disclosure may include a lower frame 20, an upper frame 30 coupled to an upper portion of the lower frame 20, and an arc cover 40 coupled to an upper portion of the upper frame 30. A first coupling part 22 may protrude from one surface of the lower frame 20 such that a fastening member 70 is fastened thereto, a second coupling part 32 may protrude from one surface of the upper frame 30 and may be connected to the first coupling part 22 such that the fastening member 70 is fastened thereto, a third coupling part 42 may protrude from one surface of the arc cover 40 and may be connected to the second coupling part 32 such that the fastening member 70 is fastened thereto. The fastening member 70 may be fastened so as to connect the first coupling part 22, the second coupling part 32, and the third coupling part 42.

Frames 20, 30, and 40 may also be referred to as an enclosure, and may be provided to accommodate and support components of the electromagnetic contactor. The frames 20, 30, and 40 include the lower frame 20, the upper frame 30, and the arc cover 40.

The lower frame may be provided. The lower frame 20 may be made of an insulating material such as a synthetic resin material. The lower frame 20 may have an open upper surface and define an accommodation space therein.

A flange 21 may protrude from a bottom surface of the lower frame 20. The bottom surface of the lower frame 20 may be supported by the ground or an attached portion so as to stably maintain embedded components.

An accessory device such as an auxiliary contact device 51 may be disposed on one side surface of the lower frame 20.

A coil assembly 55 may be accommodated inside the lower frame 20. The coil assembly 55 may be installed on a coil assembly mounting cassette 53.

A fixed core 57 having a shape like "E" may be disposed in a central portion and a peripheral portion of the coil assembly 55.

The first coupling part 22 may protrude from one side surface of the lower frame 20. The first coupling part 22 may extend downward from an upper end portion of the lower frame 20 by a predetermined length (thickness). In other words, the first coupling part 22 may not extend to a lower end portion of the lower frame 20. That is, the length (thickness) of the first coupling part 22 may be shorter than a length (height) of the lower frame 20.

A first fastening hole 23 may be formed through the first coupling part 22 in a vertical direction (in an up and down direction). The fastening member 70 may be coupled to the first fastening hole 23.

In addition, a first auxiliary fastening hole 24 may be formed through the first coupling part 22 in the vertical direction. The first auxiliary fastening hole 24 may be formed adjacent to the first fastening hole 23.

The first coupling part 22 and the first fastening hole 23 may be formed at each of both side portions (both end portions) on one surface of the lower frame 20. That is, the first coupling parts 22 and the first fastening holes 23 may be formed as a pair on the one surface. At this time, the first coupling parts 22 and the first fastening holes 23 formed on the both side portions of the one surface may be symmetrical with each other.

The first coupling part 22 and the first fastening hole 23 may be formed at each of the both side portions (both end portions) of the lower frame 20 that are symmetrical with each other. At this time, the first coupling parts 22 and the first fastening holes 23 formed on the both side portions may be formed symmetrically with each other. That is, the first coupling parts 22 and the first fastening holes 23 may be formed as pairs on both opposite side surfaces of the lower frame 20, respectively.

A protrusion 25 may protrude upward from one side surface of the lower frame 20. The protrusion 25 may be formed on the surface on which the first coupling part 22 protrudes. The protrusion 25 may be formed on each of both opposite side surfaces of the lower frame 20.

The upper frame 30 may be disposed. The upper frame 30 may be made of an insulating material such as a synthetic resin material. The upper frame 30 may have an open lower surface and define an accommodation space therein.

The crossbar 61 may be installed through the upper frame 30 to be movable up and down. In the case of a plurality of phases, the crossbar may be provided to protrude for each phase. In the case of three phases, the crossbar 61 may be formed in a shape of a trident to protrude for through of the three phases.

A movable core (not illustrated) may be coupled to a lower portion of the crossbar 61. The movable core may be moved downward by being attracted to the fixed core 57, which is magnetized when external power is applied to the coil assembly 55 and a magnetic flux is produced accordingly. Here, since the crossbar 61 is coupled to the movable core, the crossbar 61 may also be moved downward together.

A fixed contact arm 65 may be disposed on an upper surface of the upper frame 30. The fixed contact arm 65 may be disposed for each phase. The fixed contact arms 65 may be classified for each phase into a fixed contact arm disposed at a power source side and a fixed contact arm disposed at a load side. A terminal may be formed on an end portion of the fixed contact arm 65. That is, the fixed contact arm 65 may be integrally formed with the terminal.

An inter-phase insulating wall 67 may be disposed between adjacent fixed contact arms 65. The inter-phase insulating wall 67 can prevent arcs generated at the terminal from expanding into adjacent phases.

The second coupling part 32 may protrude from one side surface of the upper frame 30. Here, the surface on which the second coupling part 32 is formed may be a surface on which the fixed contact arm 65 is not exposed. The second coupling part 32 may have a length (thickness, height) from an upper end portion to a lower end portion of the upper frame 30. In other words, the second coupling part 32 may be formed from the upper end portion to the lower end portion of the upper frame 30, not only on a portion of the upper frame 30, in the vertical (lengthwise) direction. That is, the second coupling part 32 may have the same length (thickness) as the length (height) of the upper frame 30.

A second fastening hole 33 may be formed through the second coupling part 32 in a vertical direction (in an up and down direction). The fastening member 70 may be coupled to the second fastening hole 33.

A second auxiliary fastening hole 34 may be formed through the second coupling part 32 in the vertical direction. The second auxiliary fastening hole 34 may be formed adjacent to the second fastening hole 33.

The second coupling part 32 and the first fastening hole 33 may be formed at each of both side portions (both end portions) on one surface of the upper frame 30. That is, the first coupling parts 22 and the first fastening holes 23 may be formed as a pair on the one surface. At this time, the second coupling parts 32 and the second fastening holes 33 formed on the both side portions of the one surface may be symmetrical with each other.

The second coupling part 32 and the second fastening hole 33 may be formed on both side surfaces of the upper frame 30 that are symmetrical with each other. At this time, the second coupling parts 32 and the second fastening holes 33 formed on the both side portions may be symmetrical with each other. That is, the second coupling parts 32 and the second fastening holes 33 may be formed as pairs on both opposite side surfaces of the upper frame 30, respectively.

The second coupling part 32 and the second fastening hole 33 may be formed to communicate with the first coupling part 22 and the first fastening hole 23. That is, they may be formed on a surface in the same direction. This surface may be a surface on which the fixed contact arm 65 is not exposed at the upper frame 30.

A concave portion 35 corresponding to the protrusion 25 of the lower frame 20 may be formed on one side surface of the upper frame 30. The concave portion 35 may be formed on each of both opposite side surfaces of the upper frame 30.

A plurality of fitting portions 37 may protrude from the upper surface of the upper frame 30. Here, the fitting portions 37 may be formed on an upper portion of the surface where the fixed contact arm 65 is not exposed. When the arc cover 40 is coupled to the upper frame 30, a side portion of the arc cover 40 may be fitted into the fitting portions 37.

The arc cover 40 may be disposed. The arc cover 40 may be made of an insulating material such as a synthetic resin material. The arc cover 40 may have an open lower surface and define an accommodation space therein.

The crossbar 61 and a movable contact arm may operate with being accommodated in the accommodation space of the arc cover 40.

A trip button hole 41 may be formed through an upper surface of the arc cover 40. A head of the crossbar 61 may be exposed through the trip button hole 41 to perform a trip operation.

A plurality of vent holes 45 may be formed through a side surface of the arc cover 40.

The third coupling part 42 may protrude from one side surface of the arc cover 40. The third coupling part 42 may have a predetermined length (thickness) from a lower end portion of the arc cover 40. The third coupling part 42 may not extend to an upper end portion of the arc cover 40. In other words, the third coupling part 42 may be formed on only a portion of the arc chamber 40 in the vertical lengthwise direction, without being formed along an entire length of the arc cover 40. That is, the length (thickness) of the third coupling part 42 may be shorter than a length (height) of the arc cover 40.

A third fastening hole 43 may be formed through the third coupling part 42 in the vertical direction (in the up and down direction). The fastening member 70 may be coupled to the third fastening hole 43.

The third coupling part 42 and the third fastening hole 43 may be formed at each of both side portions (both end portions) on one surface of the arc cover 40. At this time, the third coupling parts 42 and the third fastening holes 43 formed on the both side portions may be symmetrical with each other.

The third coupling parts 42 and the third fastening holes 43 may be formed respectively on both side surfaces of the arc cover 40 that are symmetrical with each other. At this time, the third coupling parts 42 and the third fastening holes 43 formed on the both side portions may be symmetrical with each other. That is, the third coupling parts 42 and the third fastening holes 43 may be formed as pairs on both opposite side surfaces of the arc cover 40, respectively.

The third coupling part 42 and the third fastening hole 43 may be formed to communicate with the second coupling part 32 and the second fastening hole 33. That is, they may be formed on a surface in the same direction.

The fastening member 70 such as a screw and a nut may be provided. The fastening member 70 may be coupled through the first fastening hole 23, the second fastening hole 33, and the third fastening hole 43. Accordingly, the lower frame 20, the upper frame 30, and the arc cover 40 can be fastened by a single operation. In addition, as the arc cover 40 is integrally coupled to the upper frame 30 and the lower frame 20, such coupling can be stably maintained without separation even if an arc is frequently generated.

In order to easily couple the fastening member 70, a screw member 72 may be configured as an insert nut. The screw member 72 may be inserted into the first coupling part 22 of the lower frame 20.

An auxiliary fastening member 75 such as a screw may be provided. The auxiliary fastening member 75 may be coupled through the first auxiliary fastening hole 24 and the second auxiliary fastening hole 34. Since the upper frame 30 and the lower frame 20 are additionally coupled by the auxiliary fastening member 75, the coupling force between the upper frame 30 and the lower frame 20 can further be increased.

Figure 8:
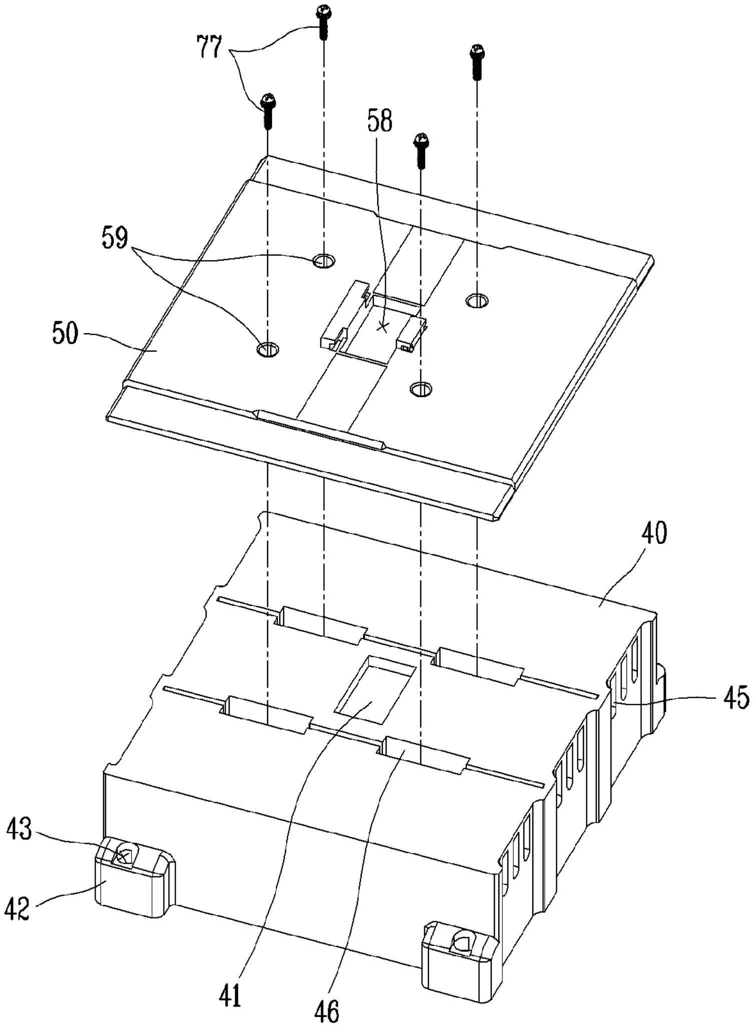
FIG. 8 is a disassembled perspective view illustrating an arc cover and a top cover of an electromagnetic contactor in accordance with one implementation of the present disclosure.

FIG. 7 is a partial lateral view in a direction B in FIG. 4, and is a partial cross-sectional view taken along the line C-C. FIG. 8 is a disassembled perspective view illustrating an arc cover and a top cover.

A top cover 50 may be provided. The top cover 50 may be coupled to an upper surface of the arc cover 40.

A button hole 58 connected to the trip button hole 41 may be formed through the top cover 50. The head of the crossbar 61 may be exposed through the button hole 58 to perform a trip operation.

Cover fastening holes 59 may be formed through the top cover 50. Positions at which the cover fastening holes 59 are formed may be portions where phases are in contact with the top cover 50.

Inter-phase insulating grooves 46 may be formed in the arc cover 40. The inter-phase insulating grooves 46 and the cover fastening holes 59 may be disposed to communicate with each other. The inter-phase insulating grooves 46 may be stepped.

Cover fastening members 77 may be disposed. The cover fastening members 77 may be coupled through the cover fastening holes 59 and the inter-phase insulating grooves 46. The top cover 50 may be stably fastened to the arc cover 40 by the cover fastening members 77. Here, the cover fastening member 77 may be configured as a bolt, to be fastened to a nut 79 disposed in a lower portion of the inter-phase insulating groove 46.

While the invention has been shown and described with reference to the foregoing preferred implementations thereof, it will be understood by those skilled in the art that various changes and modifications may be made without departing from the scope of the invention as defined by the appended claims. Therefore, the implementation disclosed in the present disclosure are not intended to limit the scope of the present disclosure but are merely illustrative, and it should be understood that the scope of the technical idea of the present disclosure is not limited by those implementations. That is, the scope of protection of the present disclosure should be construed according to the appended claims, and all technical ideas within the scope of equivalents thereof should be construed as being included in the scope of the present disclosure.

The invention claimed is:

1. An electromagnetic contactor comprising:

a lower frame;

an upper frame coupled to an upper end portion of the lower frame;

an arc cover coupled to an upper end portion of the upper frame;

wherein a first coupling part of the lower frame protrudes from a first surface of the upper end portion of the lower frame;

wherein a second coupling part of the upper frame protrudes from a first surface of the upper frame and is connected to the first coupling part;

wherein a third coupling part of the arc cover protrudes from a first surface of a lower end portion of the arc cover and is connected to the second coupling part;

a fastening member that is coupled through the first coupling part, the second coupling part, and the third coupling part, wherein the first coupling part protrudes for a first predetermined length from the upper end portion of the lower frame, and wherein the first coupling part has a first height that is shorter than a height of the lower frame, wherein the second coupling part protrudes for a second predetermined length, and wherein the second coupling part has a second height equal to a height of the upper frame from the upper end portion of the upper frame to a lower end portion of the upper frame, wherein the third coupling part protrudes for a third predetermined length from the lower end portion of the lower frame, and wherein the third coupling part has a third height that is shorter than a height of the arc cover, and wherein a first auxiliary fastening hole is formed through the first coupling part, a second auxiliary fastening hole is formed through the second coupling part; and an auxiliary fastening member having a different length than the fastening member, that is coupled through the first auxiliary fastening hole and the second auxiliary fastening hole, and not coupled through the third coupling part, wherein a protrusion protruding upward is formed on one side of an upper surface of the lower frame, and a concave portion corresponding to the protrusion is formed on one side of a lower surface of the upper frame, and a plurality of fitting portions, that are fitted into a side surface of the arc cover, are formed protruding on an upper surface of the upper frame.

2. The electromagnetic contactor of claim 1, wherein a first fastening hole is formed vertically through the first coupling part through which the fastening member is coupled, a second fastening hole is formed vertically through the second coupling part through which the fastening member is coupled, and a third fastening hole is formed vertically through the third coupling part through which the fastening member is coupled.

3. The electromagnetic contactor of claim 2, wherein the first auxiliary fastening hole is formed through the first coupling part adjacent to the first fastening hole, and the second auxiliary fastening hole is formed through the second coupling part adjacent to the second fastening hole.

4. The electromagnetic contactor of claim 1, wherein the first coupling part, the second coupling part, and the third coupling part are formed respectively at the lower frame, the upper frame, and the arc cover, on each of both side portions of a single surface thereof.

5. The electromagnetic contactor of claim 1, wherein the first coupling part, the second coupling part, and the third coupling part are formed respectively at the lower frame, the upper frame, and the arc cover, on each of two opposite surfaces thereof.

6. The electromagnetic contactor of claim 5, wherein the first coupling part, the second coupling part, and the third coupling part are formed on a surface where a fixed contact arm is not exposed, based on the upper frame.

7. The electromagnetic contactor of claim 1, wherein a top cover is coupled to an upper portion of the arc cover, and wherein the top cover has a cover fastening hole, the arc cover has an inter-phase insulating groove, and a cover fastening member is provided that is coupled through the cover fastening hole and the inter-phase insulating groove.

* * * * *